July 21, 1959   J. R. GOMERSALL   2,895,407
WAFFLE BAKER CONSTRUCTION

Filed May 5, 1954   2 Sheets-Sheet 1

INVENTOR.
John R. Gomersall
BY
Karl H. Sonnemayer

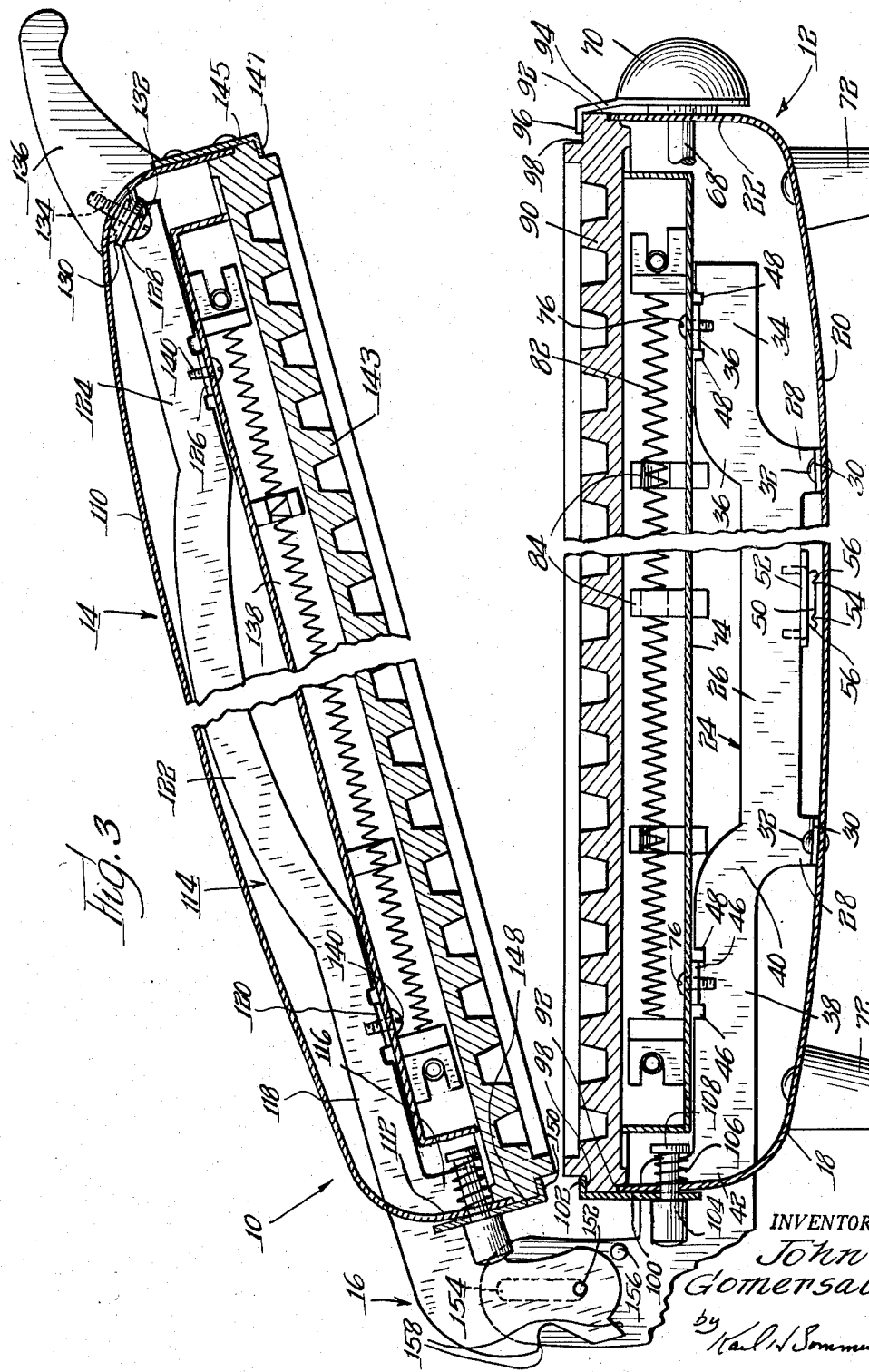

United States Patent Office 2,895,407
Patented July 21, 1959

2,895,407

WAFFLE BAKER CONSTRUCTION

John R. Gomersall, Elgin, Ill., assignor to McGraw-Edison Company, a corporation of Delaware Application May 5, 1954, Serial No. 427,721

3 Claims. (Cl. 99—379)

This invention is concerned with a waffle baker, more particularly with the physical structure thereof.

It is common practice to make waffle bakers (often spoken of as waffle irons) in the form of a pair of sheet metal shells hinged together at one edge, the shells carrying suitable waffle grids and heating elements therefor. One of the shells, usually the lower one, also preferably carries a thermostatic mechanism for properly controlling the temperature and operation of the waffle baker.

In order to fabricate waffle bakers simply and quickly, the shells often are punched from sheet metal of rather thin gage. In many instances this has led to the production of waffle bakers which have not been sufficiently strong and rigid. The provision of suitable bracing or strengthening means has slowed production, complicated construction, and increased the cost of manufacture to an uneconomical extent.

Accordingly, it is an object of this invention to provide brace means in a waffle baker which are readily assembled with the sheet metal shell and which do not significantly complicate construction and which are economical.

A further object of this invention is to provide a frame for the sheet metal shells of a waffle baker which comprises a continuation of the hinges joining the shells together.

More specifically, it is an object of this invention to provide a frame of the foregoing character wherein the frame comprises backbones integral with the hinges.

Yet another object of this invention is to provide a waffle baker having a frame attached to the shells of the waffle baker without any fastening means showing.

A further object of this invention is to provide frame members integral with the hinges of a waffle baker which brace the shell halves, and also support the reflectors and the thermostat support.

Other and further objects and advantages of the present invention will be apparent from the following description when taken in connection with the accompanying drawings wherein:

Fig. 3 is a cross-sectional view through the waffle baker taken substantially along the line 3—3 of Fig. 1.

Figure 1:
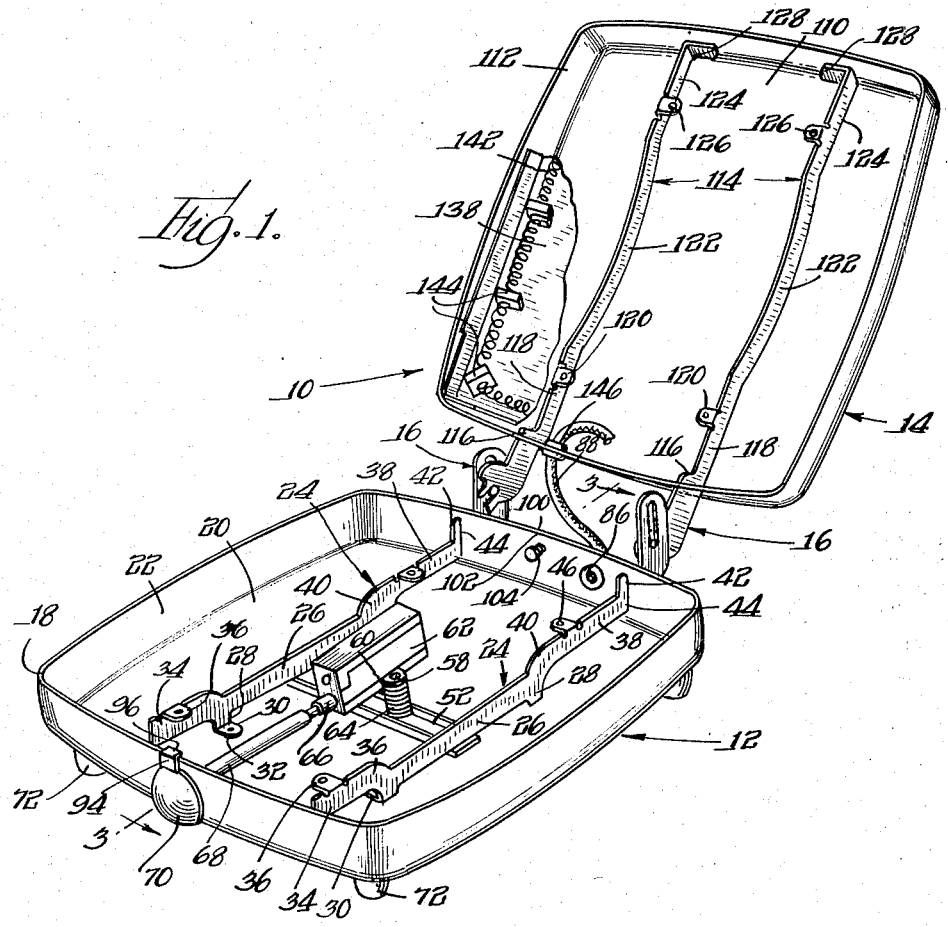
Fig. 1 is a perspective view of a waffle baker constructed in accordance with the principles of the invention, certain parts being broken away and other parts being omitted for clarity of illustration.
Figure 2:
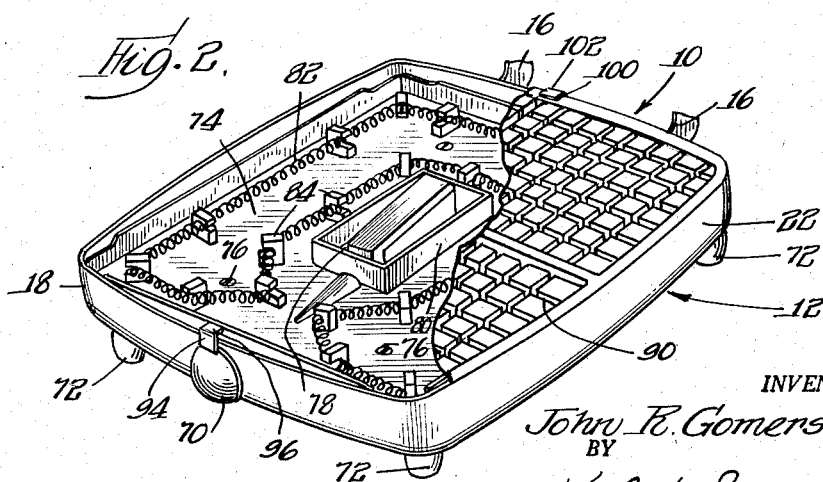
Fig. 2 is a perspective view of the lower half of the waffle baker showing additional parts thereof.

Referring now in greater particularity to the figures, there will be seen a waffle baker identified generally by the numeral 10. The waffle baker comprises a lower half 12 and an upper half 14 connected by a pair of hinges 16.

The lower half comprises a generally square sheet metal shell 18 having a bottom 20 and an upstanding peripheral wall 22 integral therewith. It will be understood that the substantially square shape is by way of illustration only, and that the waffle baker could be rectangular, round, or substantially any other suitable or desirable shape.

A pair of hinge bars 24 extends through suitable slots in the rear portion of the upstanding peripheral wall 22, and is integral with the pair of hinges 16. Each hinge bar 24 is flat throughout its length, and is constructed of sheet metal of somewhat heavier gage than the shells 18. The hinge bars 24 must be made of sufficiently heavy stock to resist deformation within their planes, but need not withstand any substantial transverse stress as there is little likelihood of any such stress being imposed on them, and such stresses are resisted by the material of the shells. Each hinge bar 24 is provided with a straight central portion 26 having depending projections or legs 28 at the opposite ends thereof. Right angularly disposed feet 30 are provided at the lower ends of the legs 28, and these feet are secured by means such as rivets 32, or any other suitable fastening means, to the bottom wall or floor 20 of the lower shell.

Each hinge bar 24 is provided with a forward horizontal portion 34 which is offset upwardly from the central portion 26 as at 36. The forward portions 34 are provided along their upper edges with right angularly disposed ears 36 which are suitably apertured for attachment to a reflector as will be set forth hereinafter.

Each hinge bar 24 further is provided with a rearwardly projecting horizontal portion 38 substantially alinged with the forwardly projecting horizontal portion and offset upwardly from the central portion as at 40. The horizontal portions 38 are provided at their extreme rear ends with enlargements 42 extending through suitable slots 44 in the rear portion of the upstanding peripheral wall 22. The enlargements 42 are integral with the hinges 16, and the construction of the hinges will be brought out more fully hereinafter. Ears 46 similar to the ears 36 and coplanar therewith are provided on the rear horizontal portions 38 for attaching the reflector shortly to be set forth. It will be observed that the ears 36 and 46 are separated from the horizontal portions by spaces 48.

Each hinge bar 24 is further provided along the bottom edge of its intermediate or central portion 26 with a downwardly projecting tongue 50. A channel 52 extends transversely between the hinge bars 24 and has its channels flattened substantially into the plane of the web in the vicinity of the hinge bars. A slot is placed in the web adjacent each end of the channels, and the tongues 50 extend through these slots. A nick 54 is forced into each tongue 50 adjacent the opposite free corners thereof, thereby swaging these corners 56 outwardly beyond the ends of the slot to hold the channel 52 on the hinge bars.

A pair of rods 58 extends upwardly from the channel 52 generally near the center thereof, and these rods pass through ears 60 on a thermostat support 62. Coil springs 64 encircle the rods 58 and are compressed between the channel 52 and the ears 60 to urge the thermostat support upwardly into engagement with the lower waffle grid hereinafter to be set forth for responding to the temperature of such grid. The thermostat is housed within the support 62 and may be of any known or suitable construction. A shaft 66 extends from the front of the support 62 and is universally coupled by any known or suitable means to a rod 68. The rod 68 projects through the forward portion of the upstanding peripheral wall 22 and has a knob 70 suitably affixed thereon for effecting rotation of the shaft 66 and thereby adjusting the thermostat in the support 62.

The lower half or portion of the waffle baker further comprises a plurality of feet 72 affixed to the bottom of the shell 12 near the bottom corners thereof, and made of rubber or non-marring material.

A reflector 74 in the form of a flat, shallow pan and generally of a type well known in the art is secured to the ears 36 and 46 by means of screws 76 passed through suitable apertures in the bottom of the reflector and threaded into apertures in the ears. The apertures in the ears may be prethreaded for receipt of machine screws, or self-tapping screws may be used. The reflector 74 is provided with a central opening 78 for accommodating the thermostat support 62, and an integral wall 80 surrounds the opening 78 for shielding the thermostat support and the thermostat carried thereby from heat supplied directly from the heating coils. The heating coils 82, as will be observed, are supported within the reflector by suitable ceramic supports 84.

A grommeted aperture 86 is provided in the rear portion of the peripheral wall 22 for entrance of a conventional power cord to energize the heating coils through the thermostat associated with the support 62. An additional wire 88 passes through this grommeted aperture for supplying power to the upper half of the waffle baker as will be apparent hereinafter.

A removable grid 90, which may be of known construction, is supported directly above the heating coils 82 by any suitable means, and preferably is made of aluminum because of the desirable heat transfer characteristics of this metal. The grid 90 may rest on top of the edge of the peripheral wall 22, the grid being provided with a shoulder 92 for this purpose. A finger 94 upstands from behind the knob 70 and is provided with a substantially horizontally disposed tip 96 overlying an upper peripheral shoulder 98 of the grid 90 to hold the grid down adjacent the front portion thereof.

A finger 100 having a horizontally disposed tip 102 cooperable with the shoulder 98 is provided at the rear of the bottom shell 12 for locking the rear portion of the grid in place. The finger 100 is mounted by means of a stud 104 which is urged inwardly of the shell by means of a coil spring 106 encircling the stud and trapped between an enlargement 108 thereon and the rear portion of the peripheral wall 22. Accordingly, the finger tip 102 can be backed away from the grid 90 by retraction of the stud 104 when it is desired to remove the grid 90.

The upper portion or shell 14 of the waffle baker is generally similar to the lower portion being of similar horizontal configuration and having a top wall 110, and a depending peripheral wall 112. A pair of hinge bars 114 comprises an integral continuation of the hinges 16. Each hinge bar includes an enlarged portion 116 passing through a slot in the rear portion of the depending peripheral wall 112. Forwardly of each enlarged portion 116 there is a rear horizontal portion 118 corresponding to the portions 38 of the lower hinge bars. An ear 120 is provided on each of these rear portions for mounting a reflector as will be brought out hereinafter. Each hinge bar 114 projects forwardly from the rear portion 118 in the form of an arc 122 pressing against the under side of the top 110 with sufficient force to stress the top against ready denting, and against rattling relative to the hinge bars 114.

Forwardly of the arc 122 of each hinge bar 114 there is a front horizontal portion 124 provided with an ear 126 for attachment of the reflector hereinafter to be described.

At the top, forward corner of the front horizontal portion 124 of each hinge bar 114, there is provided an angularly disposed ear 128 which is positioned at right angles to the plane of the hinge bar 114. Each ear is aligned with a depressed portion 130, and a tubular rivet 132 is passed through each aligned ear and depressed portion for holding the ears to the upper shell 14. Screws 134 are passed through the tubular rivets for mounting an insulating handle 136, thus hiding the attachment of the hinge bars to the top shell 14. Since the hinge bars 114 are otherwise united with the upper shell 14 only by engagement of the enlargements 116 with their respective slots, and by impingement of the arcs 122 against the under side of the top 110, no attaching means are visible to mar the appearance of the waffle baker. The rivets 32 being in the bottom of the waffle baker are out of sight, and hence the hinge bars 24 and 114 forming the frame of the waffle baker do not present any unsightly attachments to the remainder of the waffle baker.

A reflector 138 which is generally similar to the reflector 74, but without the central opening therein, is held against the bottom edges of the hinge bars by means of screws 140 passing through suitable apertures in the reflector and threaded into the ears 120. Heating elements or coils 142 are carried from the reflector by ceramic blocks 144, and these coils are energized from the wire or line 88, this wire or line passing through a grommeted aperture 146 in the back portion of the depending peripheral wall 112.

A grid 143 similar to the grid 90 is held in the top part of the waffle baker by means of a fixed finger 145 having an inwardly bent tip 147 and by a spring biasing finger 148 having an inwardly directed tip 150.

The hinges 16 are of generally well known construction, except for their being integral with the hinge bars. This construction, as is known, includes a pin 152 fixed in one of each of the hinges and received in a slot 154 in the cooperating hinge. A stop pin 156 is provided on one of each pair of hinges and suitable stops or projections 158 are provided on the cooperating hinge member for holding the top portion 14 of the waffle baker in vertical position, or in fully opened horizontal position.

It now will be apparent that the frame herein shown and described constitutes a rigid backbone for the waffle baker so that the shells thereof can be made of rather thin gage sheet metal without danger of deformation. The reflectors are rigidly supported by the frame as is the thermostat bracket. The frame is inexpensive to produce and is easy to assemble with the remaining parts of the waffle baker, and furthermore strengthens the attachments of the hinges to the shells. The attachments of the frame to the case or shells are substantially invisible, being on the bottom of the lower shell where they are out of sight, and being hidden by the handle on the upper shell, the intermediate and rear attachments of the upper frame being frictional and impinging only.

The specific example of my invention herein shown and described will be understood as being for illustrative purposes only. Various changes in structure will doubtless occur to those skilled in the art, and it is to be understood that such structural changes comprise a part of my invention insofar as they fall within the spirit and scope of the appended claims.

I claim:

1. A waffle baker comprising generally complementary upper and lower body shells respectively having substantially horizontal top and bottom walls, a pair of hinges hingedly interconnecting said upper and lower body shells, a pair of upper and a pair of lower substantially rigid hinge bars forming integral continuations of said hinges and substantially inflexible vertically, said lower pair of hinge bars being attached to the substantially horizontal bottom wall of said lower body shell at spaced apart positions to brace the same, said upper pair of hinge bars being attached to said upper body shell at the front thereof and bearing against an intermediate portion of said top wall to brace the same, cooking plates carried in said upper and lower body shells, and electric heating means for said cooking plates supported by the upper and lower pairs of hinge bars adjacent the cooking plates for heating the same.

2. A waffle baker as set forth in claim 1 wherein the hinge bars comprise substantially flat, strap-like members arranged perpendicular to the adjacent surfaces of the body shells substantially in vertical planes.

3. A waffle baker as set forth in claim 2 wherein the hinge bar straps are provided with angularly disposed ears by means of which the shells are secured to the hinge bars, and further including a transverse brace between a corresponding pair of said hinge bars, and thermostatic means carried by said brace adjacent one of said cooking plates.

References Cited in the file of this patent

UNITED STATES PATENTS

| | | |
|---|---|---|
| 1,687,662 | Fay | Oct. 16, 1928 |
| 1,822,314 | Reichold | Sept. 8, 1931 |
| 2,040,369 | Fischer | May 12, 1936 |
| 2,161,446 | Barnes | June 6, 1939 |
| 2,342,077 | Jepson | Feb. 15, 1944 |
| 2,765,727 | Lipsich et al. | Oct. 9, 1956 |